United States Patent [19]
Chen et al.

[11] 3,758,602
[45] Sept. 11, 1973

[54] SELECTIVE CATALYSIS

[75] Inventors: Nai Yuen Chen, Cherry Hill; Stanley J. Lucki, Runnemede, both of N.J.

[73] Assignee: Mobil Oil Corporation, New York, N.Y.

[22] Filed: Mar. 11, 1970

[21] Appl. No.: 877,578

Related U.S. Application Data

[62] Division of Ser. No. 531,045, March 2, 1966, Pat. No. 3,535,398.

[52] U.S. Cl. ............................. 260/676 R, 260/677
[51] Int. Cl. .......................... C07c 9/00, C07c 11/00
[58] Field of Search ................... 260/676 R, 677 H; 208/DIG. 2

[56] References Cited
UNITED STATES PATENTS

| | | | |
|---|---|---|---|
| 2,850,549 | 9/1958 | Ray | 208/DIG. 2 |
| 3,236,903 | 2/1966 | Milton | 208/DIG. 2 |
| 3,294,858 | 12/1966 | Butler et al. | 260/676 R |
| 3,314,895 | 4/1967 | Munns, Jr. | 208/DIG. 2 |

*Primary Examiner*—Delbert E. Gantz
*Attorney*—Oswald G. Hayes and Donald L. Dickerson

[57] ABSTRACT

The invention relates to a process for selectively cracking polar compounds from non-polar saturated hydrocarbons in the presence of a crystalline aluminosilicate catalyst having a pore size of about 5 Angstrom units wherein a mixture of polar compounds and non-polar saturated hydrocarbon species having dimensions no greater than 5 Angstrom units are contacted with the aluminosilicate. The molecular species which is capable of being sorbed within the internal pores of the aluminosilicate at a faster rate than the other species is selectively cracked to a chemical species which is distinct from the species admitted.

3 Claims, No Drawings

SELECTIVE CATALYSIS

This is a division of application Ser. No. 531,045, filed Mar. 2, 1966 now U.S. Pat. No. 3,525,398.

This invention relates to a novel process for the selective conversion of certain organic compounds from a mixture of the same with other reactants. More particularly, the present invention is directed towards a novel selective conversion process utilizing differences in rates of sorption by crystalline aluminosilicates of various organic compounds.

The use of aluminosilicates to achieve selectivity between a mixture of various compounds based on differences in molecular shape or size is well known in the art. Thus, for example, an early development in this area involved the use of crystalline aluminosilicates, commonly referred to as molecular sieves, to effect a simple physical separation of a mixture of organic compounds which differed in molecular dimensions.

Various processes of this general type have been proposed for treating mixtures or petroleum fractions containing branched-chain and straight-chain hydrocarbons, by selectively adsorbing the straight-chain hydrocarbons therefrom, employing absorbents which selectively absorb the straight-chain compounds to the substantial exclusion of the branched-chain compounds. To achieve such separation, molecular sieves have beem employed for effecting physical separation of mixtures of materials of varying molecular size. Such substances have been described by Barrer in several publications and in U.S. Pat. No. 2,306,610 and U.S. Pat. NO. 2,413,134. Thus, molecular sieves are essentially the dehydrated forms of crystalline natural or synthetic hydrous siliceous zeolites containing varying quantities of sodium, calcium and aluminum with or without other metals. All or a portion of the sodium or calcium ions normally contained in the molecular sieve structure may be zeolitically replaced with a number of various other ions. The atoms of sodium, calcium or metal in replacement thereof, silicon, aluminum and oxygen in these zeolites are arranged in the form of an aluminosilicate salt in a definite and consistent crystalline pattern. This structure contains a large number of small cavities, interconnected by a number of still smaller holes or channels. These cavities and channels are precisely uniform in size. Chemically, these zeolites may be represented by the general formula:

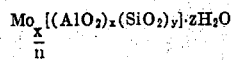

where Me is a metal cation, $x/n$ is the number of exhangeable cations of valence $n$, $x$ is also the number of aluminum atoms combined in the form of aluminate, $y$ is the number of silicon atoms and $z$ is the number of water molecules, removal of which produces the absorptivity of the zeolite. At the present time, various types of molecular sieves can be prepared, as more fully hereinafter discussed, designated as zeolites A ZK4, ZK5, alpha, S, T and D, and the natural zeolites chabazite, gmelinite and offretite having the aforementioned properties are also available, and which are crystalline aluminosilicates having pores of about 5A in diameter.

Additionally, aside from effecting a mere physical separation, crystalline aluminosilicates have also been used to achieve shape-selective conversion between a mixture of various compounds based on differences in molecular shape. In this connection, U. S. Pat. No. 3,140,322 discloses and claims the selective conversion of at least two molecular species of differing shape utilizing crystalline aluminosilicates having a pore size sufficient to admit one molecular species, either a reactant or product, to the exclusion of the other and effecting a chemical conversion within said pores.

Thus, it can be seen that in the heretofore practiced processes, either physical separation of catalytic conversion, involving selectivity with crystalline aluminosilicates it was essential that a difference in molecular shape between the reactants or products was present. The entire basis for selectivity was predicated on the fact that the pores of an alumino-silicate would selectively admit some reactants or release some products to the substantial exclusion of others due to the fact that certain reactants or products had a molecular size or shape which was larger than the pore size of the crystalline alumino-silicate.

It should be immediately obvious that although the above-described processes were very effective in accomplishing their respective objectives, their use was limited to those situations involving a mixture of reactants which differed as to molecular dimension. It should also be readily apparent that many situations exist wherein selectivity is desired from a mixture of reactants which all have approximately the same molecular diameter.

Accordingly, it is the primary object of this invention to provide a novel process for effecting selective catalytic conversion of certain organic compounds from a mixture of reactants wherein all reactants have a molecular dimension such that they can enter the internal cavities of an aluminosilicate having a pore size of about 5 Angstrom units.

The novel process of this invention is based on the fact that although compounds which have molecular dimensions such that they can enter within the pores of an aluminosilicate, their rate of sorption by the aluminosilicate will vary depending upon many factors including the specific nature of the compound. Thus, for example, in the reaction mixture containing the materials A and B which would normally react catalytically to give the respective products A' and B', it is possible to selectively provide only for the reaction A → A' if, in fact, the rate of sorption of A by the aluminosilicate is far greater than the rate of sorption B so that A will enter the pores of the aluminosilicate and be converted to A'. It will be immediately noted that in the above example the molecular diameter of B is such that it is not prevented from entering the pores of the aluminosilicate, but the selectivity of the instant invention is due to the fact that B enters the pores of the aluminosilcate far more slowly than A so that A can enter and be changed to A' in a selective manner.

The process of the instant invention is particularly adapted to the separation of straight-chain polar compounds from mixtures of the same with straight-chain nonpolar compounds, as well as the separation of cis-isomers from trans-isomers. Thus, in accordance with the novel teachings of this invention, it is possible to separate polar compounds, i.e. carboxylic acids, organic phosphorous containing compounds, organic sulfur containing compounds, nitriles, organo nitro compounds, aldehydes, ketones and estors having a diameter of about 5 Angstrom units or less from mixtures of the same with nonpolar straight-chain compounds having a molecular diameter of about 5 Angstrem units of less, i.e. hydrocarbons such as pentane, hexane, butane, butene, heptene, etc.

In like manner, the novel process of this invention can be employed to effect selective conversion of cis and trans-isomers, i.e. cis-butene-2 from trans-butene-2 and cis-1,3-pentadiene from trans-1,3-pentadiene. As has heretofore been stated, selectivity is achieved not by virtue of the complete exclusion of one of the componets from the catalytic sites contained within the pores of the aluminosilicate, but by the difference in the rate of diffusion of the various isomers through the pores of the aluminosilicate.

The crystalline aluminosilicates employed herein for accomplishing the selective conversion indicated above, have pore size structures of about 5A diameter of Si/Al ratios of at least about 1.0 and preferably of at least 1.6. The crystalline aluminosilicates, contemplated for the purposes of this invention include ZK4, ZK5, alpha, A, S, T and D types and the natural occurring zeolites chabazite, gmelinite and offretite. A description and preparation of the ZK4 type crystalline alumino-silicate, as described above, is disclosed in application Ser. No. 134,841, filed Aug. 30, 1961 now U.S. Pat. No. 3,314,752. A description and preparation of the ZK5 type crystalline aluminosilicate is disclosed in application Ser. No. 174,718, filed Feb. 21, 1962 now abandoned. A description and the preparation of the alpha type crystalline aluminosilicate is disclosed in application Ser. No. 237,289, filed Nov. 13, 1962 now U.S. Pat. No. 3,375,205. A description and the preparation of the S type crystalline aluminosilicate is disclosed in U.S. Pat. No. 3,054,657, issued Sept. 18, 1962. A description and the preparation of the T type crystalline alumino-silicate is disclosed in U.S. Pat. No. 2,950,952, issued Aug. 30, 1960. A description and the preparation of the D type crystalline aluminosilicate is described in British No. 868,846 (Series of 1960). The disclosures of the aforementioned pending patent applications and patents are incorporated herein by reference and constitute part of the disclosure of this application. It will be understood, of course, that other types of crystalline aluminosilicates having a pore size structure of about 5A diameter and a Si/Al ratio of at least about 1.0 can also be employed in the novel method of the present invention.

A particularly preferred embodiment of this inveniton involves the use of crystalline aluminosilicates having a silicon to aluminum atomic ratio of at least 1.6, especially when it is desired to effect selective conversion of polar straight-chain compounds from nonpolar straight-chain compounds. For reasons not completely understood, it has been found that in general aluminosilicates which have a silicon to aluminum ratio of at least 1.6 afford a far greater rate of sorption of polar straight-chain compounds than do aluminosilicates with a lower silicon to aluminum ratio. As will be hereinafter set forth in the examples, the relative rate of sorption of polar compounds by aluminosilicates having a silicon to aluminum ratio of at least 1.6 can vary up to a thousand times that by an alumino-silicate having a silicon to aluminum ratio less than 1.6, i.e., Zeolite A.

An important feature of the method of this invention is the provision of suitable catalytic activity within the intra-crystalline structure in conjunction with the catalytic reaction system desired, although it is to be understood that the alumino-silicate might intrinsically have the desired catalytic activity.

Catalytically active materials may be introduced into the crystal lattice by suitably contacting the zeolitic solids with solutions containing catalytically active components such as zinc, cobalt, nickel, silver and others. In this manner, a catalytically active element can be introduced by deposition of the incoming metal on the zeolitic solid after drying the solution from the crystalline carrier. Often, establishment of catalytic centers can be effectively achieved by exchanging a portion of the metal ion of the aluminosilicate with an ion exhibiting catalytic activity from the desired conversion. Thus, for example, a portion of the sodium or calcium ions normally contained in the molecular sieve structure may be zeolitically replaced with a number of various other ions such as silver, copper, aluminum, hydrogen, zinc, strontium, cobalt, gold, potassium, nickel, rare earths, ammonium, cadmium, mercury, lithium and magnesium. Replacement is suitably accomplished by contacting the molecular sieve with a solution of an ionizable compound of the ion which is to be zeolitically introduced into the molecular sieve structure for a sufficient time to bring about the extent of desired introduction of such ion. After such treatment, the aluminosilicate is water-washed and calcined and thereafter is ready for use.

The novel process of this invention is applicable for a wide variety of selective conversion processes. Thus, for example, polar compounds can be selectively cracked from a mixture of the same with normal aliphatic hydrocarbons. Additionally selective hydrogenation of polar compounds from a mixture of the same with nonpolar straight-chain compounds can be carried out in accordance with the teachings of this invention. This invention is also applicable for the selective hydrogenation of trans-isomers from a mixture of the same with the corresponding cis-isomers. Other conversions wherein the novel process of this invention finds utility is for the selective halogenation of either polar compounds or trans-isomers.

The following data and examples will serve to illustrate the novel method of this invention but it is not intended that it be limited thereto.

EXAMPLES 1 – 4

These examples will illustrate the relative rates of sorption by aluminosilicates having varying silicon to aluminum ratios.

In these examples a one gram sample of a calcined synthetic zeolite identified as 5A having a silicon to aluminum ratio of 1 and a one gram sample of a calcium-exchanged synthetic aluminosilicate identified as Zeolite T and having a silicon to aluminum ratio of about 3.5 were contacted with 10 milliliter solutions containing 0.4 percent by weight of propionitrile in cyclohexane. Samples of the solution were removed from time to time and the sorption of the nitrile was measured. Cyclohexane solutions of 1-nitropropane, n-hexane and n-hexanoic acid were treated in a similar manner. The following table illustrates the effect of the silicon to aluminum ratio of the zeolite on the relative rates of sorption.

TABLE

| Example | Compound | Relative Rate of Sorption (Zeolite T) (Zeolite A) |
|---|---|---|
| 1 | n-hexane | 0.5 |
| 2 | 1-nitropropane | 1.5 |
| 3 | propionitrile | 4.0 |
| 4 | n-hexanoic acid | 1000 |

From the above examples, it can be seen that the silicon to aluminum ratio has a considerable effect on the rate of sorption of various organic compounds.

EXAMPLES 5 – 10

These examples will also illustrate the effect of the relative rates of sorption of aluminosilicates as a function of silicon to aluminum ratio.

In these examples, a variety of calcium exchanged crystalline aluminosilicates having pores of about 5 Angstrom units in diameter were contacted with a vapor of acetic acid and the amount of acetic acid sorbed was measured with the results shown in the following table.

TABLE

| Example | Zeolite | Si/Al | Acetic Acid Sorbed (Weight % Zeolite) |
|---|---|---|---|
| 5 | A | 1.0 | L1.0 |
| 6 | ZK-4 | 1.6 | 2.1 |
| 7 | Alpha | 2.0 | 6.1 |
| 8 | ZK-5 | 2.5 | 3.2 |
| 9 | S | 3.0 | 10.9 |
| 10 | T | 3.5 | 10.0 |

EXAMPLES 11 – 13

In these examples, a mixture of trans and cis-butene-2 were hydrogenated over 0.3 milliliters of a crystalline alumino-silicate identified as Zeolite 5A containing platinum within the internal pore structure thereof at an apparent residence time of 0.16 seconds. The results are shown in the following table.

TABLE

| Example | Degrees F. | $H_2/HC$ | Initial trans-cis ratio | On stream time in minutes | Hydrogenation (weight 5) | Final trans-cis ratio |
|---|---|---|---|---|---|---|
| 11 | 249 | 10 | 3.7 | 20 | 45.9 | 2.18 |
| 12 | 327 | 10 | 3.7 | 30 | 22.9 | 2.88 |
| 13 | 209 | 10 | 3.7 | 40 | 9.7 | 3.32 |

From the above three examples, it can be seen that in all instances the ratio of the trans-isomer to the cis-isomer decreased due to the fact that the trans-isomer was selectively hydrogenated at a far faster rate than the corresponding cis-isomer. It will be appreciated that the aluminosilicate employed has a pore size sufficiently large to allow both the passage of the cis and trans-isomers within the internal pore structure thereof but the trans-isomer is sorbed at a far faster rate thereby allowing for the selective conversion.

EXAMPLE 14

This example illustrates the selective chlorination of acetic acid from a mixture of the same with n-hexane.

A mixture of acetic acid, n-hexane and chlorine is contacted with a calcium exchanged crystalline aluminosilicate identified as Zeolite T at a temperature of about 350°C. After three minutes, the reaction is stopped and an analysis of the product shows that a substantial quantity of chloroacetic acid is obtained and an almost negligible quantity of chlorohexane.

EXAMPLE 15

Five grams of a catalyst identified as chabazite containing elemental platinum within its internal pore structure is contacted with a mixture of acrolein and n-butene in a shaker bomb and with hydrogen at an initial pressure of 30 psig. under constant agitation. An analysis of the products obtained after the run was terminated shows that the majority of the converted product was propionaldehyde with extremely little butane thereby demonstrating the selectivity of the process.

EXAMPLE 16

A mixture of n-hexane and 1-nitropropane is contacted with a calcium exchanged crystalline aluminosilicate identified as Zeolite T at elevated temperatures in the order 800°F. Analysis shows that the mole ratio of n-hexane to 1-nitropropane increased significantly due to the fact that the 1-nitropropane was selectively cracked because of the vast difference in rates of sorption between n-hexane and 1-nitropropane.

While preferred embodiments of the novel method of this invention have been described for purposes of illustration, it will be understood that various modifications thereof which will be obvious to those skilled in the art may be made without departing from the spirit of the invention.

What is claimed is:

1. A process for selectively cracking polar compounds from non-polar saturated hydrocarbons under cracking conditions in the presence of a crystalline aluminosilicate catalyst having a pore size of about 5 Angstrom units and bearing within the interior thereof catalytic sites which comprises contacting the same with a mixture of organic polar compounds and non-polar saturated hydrocarbon species having molecular diameters no greater than 5 Angstrom units, at least one of which is capable of being sorbed within the internal pores of said aluminosilicate at a faster rate than at least one other speices, effecting a catalytic cracking of the molecular species which has the greater rate of sorption so as to convert the same to a cracked species distinct from said admitted species and of a molecular shape capable of passing from the interior of said aluminosilicate.

2. The process of claim 1 wherein the reaction mixture comprises straight-chain nitro polar compounds and straight-chain nonpolar compounds.

3. The process of claim 2 wherein straight-chain nitro polar compounds are selectively cracked.

* * * * *

PO-1050
(5/69)

UNITED STATES PATENT OFFICE
CERTIFICATE OF CORRECTION

Patent No. 3,758,602        Dated September 11, 1973

Inventor(s) NAI YUEN CHEN and STANLEY J. LUCKI

It is certified that error appears in the above-identified patent and that said Letters Patent are hereby corrected as shown below:

Column 1, line 3,    "3,525,398" should be --3,535,398--.

Column 1, line 23,    "absorbents" should be --adsorbents--.

Column 1, line 24,    "absorb" should be --adsorb--.

Column 1, line 39,    "metal" should be --metals--.

Column 1, line 48,    "Mo" should be --Me--.

Column 1, line 57,    "ab-" should be --ad- --.

Column 2, line 10,    "of" should be --or--.

Column 3, line 2,    "of" (second occurrence) should be --or--.

Column 3, line 18,    "of" (first occurrence) should be --and--.

Column 4, line 14,    "from" should be --for--.

Column 5, line 47, in Table, fifth heading, third line, "(weight 5)" should be --(weight %)--.

Signed and sealed this 12th day of February 1974.

(SEAL)
Attest:

EDWARD M. FLETCHER, JR.
Attesting Officer

C. MARSHALL DANN
Commissioner of Patents